UNITED STATES PATENT OFFICE.

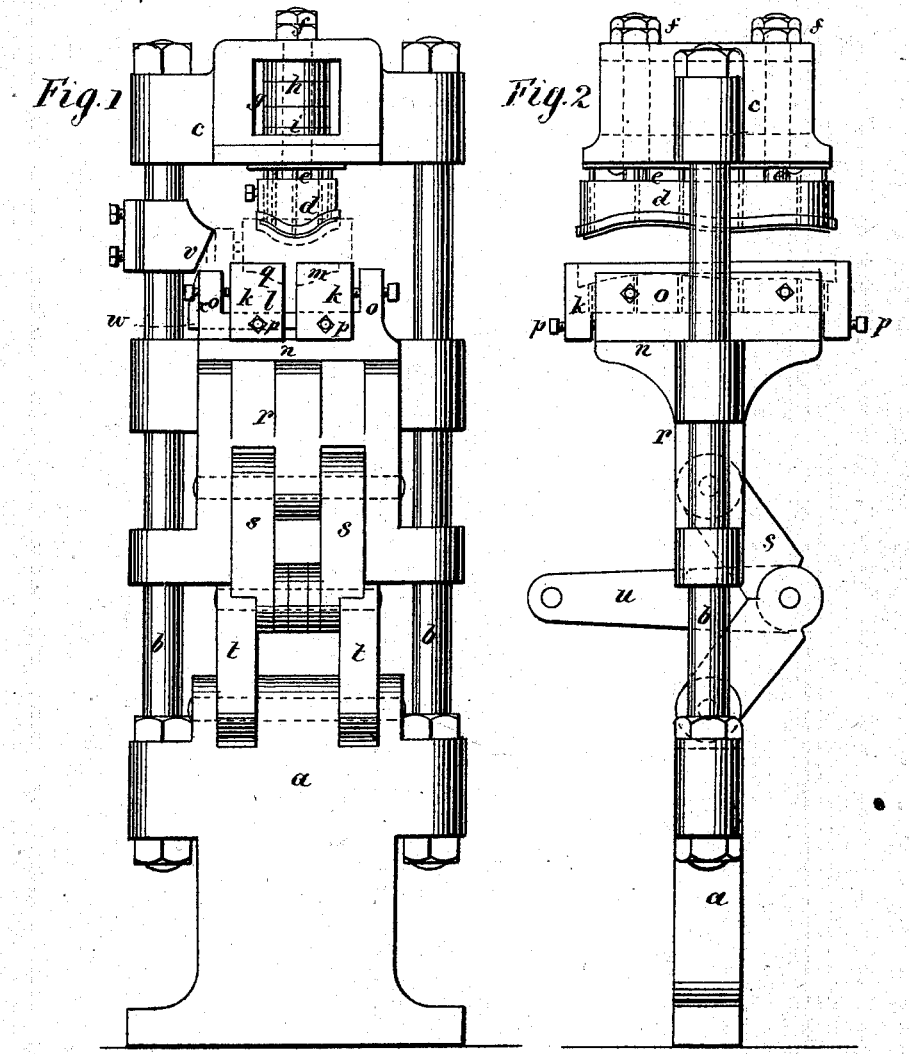

STEPHEN W. BALDWIN, OF YONKERS, NEW YORK.

IMPROVEMENT IN MACHINES FOR MOLDING BOOT AND SHOE BOTTOMS.

Specification forming part of Letters Patent No. 139,354, dated May 27, 1873; application filed August 8, 1871.

*To all whom it may concern:*

Be it known that I, STEPHEN W. BALDWIN, of Yonkers, in the county of Westchester and State of New York, have invented an Improvement in the Manufacture of Boot and Shoe Bottoms; and I do hereby declare that the following, taken in connection with the drawings which accompany and form part of this specification, is a description of my invention sufficient to enable those skilled in the art to practice it.

This invention relates to the production of boot and shoe bottoms or bottom-blanks, made up of layers, by compacting together the layers and compressing the opposite faces and the edges into their rounded and curved ultimate shapes.

The invention consists in the employment of a mold and a die or follower, the edge surfaces of the mold corresponding to the shape to be imparted to the edges of the leather, while the opposite broad surfaces or superficies of the mold and die may have such shape as will impart to the upper and lower surfaces of the leather the requisite form, the leather or layers of leather, preferably when moist or in temper, being cut to an approximation to the outline or contour of the finished bottom, and being placed in the mold, and the mold and die being then brought together and against the layers, simultaneously compressing them between the molding surfaces and imparting the requisite edge-surface or contour thereto, by pressure of the leather against the mold-surfaces. The bottom to be thus formed, is made up, preferably, of a series of lifts or layers of leather, and the action of the molding mechanism packs these layers firmly together, as well as shapes the top, bottom, and edge surfaces, bringing the edges into the proper regular and curved shape of a finished bottom; the invention consisting in such method of making a boot or shoe bottom or bottom-blank, as well as in the organization of mechanism by which I prefer to practice such method.

The drawing represents a machine embodying, or for practising, the invention in the manufacture of boot and shoe soles.

A shows a front elevation of the machine. B is a side elevation of it. *a* denotes a bed-frame. *b b*, two stationary vertical rods extending up from the frame and supported by it, there being at the top of these rods a cross-beam, *c*. Under this beam is a die-block or former, *d*, the bottom surface of which is of the irregular or curved shape of one side of a boot or shoe sole or heel. This die or die-block may be secured directly to the beam, but is preferably so fastened thereto as to be capable of an upward yielding motion, so that it may slightly yield under the pressure of the movable mold. For this purpose it has bolts or pins *e* projecting from it and extending through the beam, the bolts being fastened by suitable nuts or other fastenings *f*, and the beam is made with an opening or passage, *g*, in which are springs *h* placed around the bolts and pressing down upon flanges *i* extending from the bolts, the stress of the springs keeping down the die to an extent determined by the nuts *f*, and the bolts and springs permitting the die to rise if the stress of the springs be overcome. *k* denotes the mold, the wall or edge of the cavity of which is of the form to be imparted to the contour of the sole, or boot or shoe bottom. This mold is made movable, the die-block being stationary, and is shown as made sectional or with two parts or jaws, *l m*, placed on top of a table, *n*, and between cheeks *o o*, one of which is movable. Each section *l m* is preferably made adjustable relatively to the adjacent cheek by suitable screws *p*. One of the mold sections is made movable relatively to the other, or toward and from it, and when the two are brought together the mold-recess *q* is formed, the bottom of which is of the shape to be imparted to the surface of the sole resting thereupon, and the edges of which are of the form to be imparted to the edge of the finished sole. The table *n* is at the top of a frame, *r*, sliding vertically on the rods *b b*, and this frame is raised to bring the mold and die-block together by any suitable mechanism; that shown being a toggle mechanism, the upper arms *s* of which are jointed to the slide-frame *r*, and the lower arms *t* to the main frame *a*, the inner arms of both sets being jointed together and to a link, *u*, by lateral movement, of which link the toggle-arms are operated to raise or lower the mold-frame. On one of the vertical guide and support rods $b$ is fixed an incline, $v$, so constructed and applied that as the mold-frame moves up a projection, $w$, on the side of the movable cheek $o$, to which the movable mold-section is fastened, strikes the incline and is forced inward by it, the cheek moving on suitable ways or guides, and its movement bringing the two sections of the mold together.

The operation is as follows: The toggle-arms being thrown out of line, the mold-frame is at its lowest position, and the mold-jaws are opened to receive the blank to be surface-compressed and edge-compressed. Then the blank, made up of the requisitie number of layers of leather, is introduced into the mold-recess, the leather being preferably moist or in temper. The toggle-arms are then straightened or the movable frame otherwise raised, and as the mold reaches the die-block $d$, and the block enters the mold, the opposite surfaces of the leather, or the layers of leather, will be compressed by the face of the mold and the under side of the die-block. Before the die-block enters the mold, however, the movable mold-jaw is thrown in by the incline so that the mold is closed, the edges of the mold pressing upon the edges of the leather and the faces of the die-block and mold then compacting the layers together and pressing and compressing and shaping at once the top and bottom surfaces and the edges of the blank, all into proper shape ready for application to the boot or shoe, and forcing the edges outward against the wall of the mold, thus shaping such edges and imparting a hardness and finish thereto.

The mechanism may be so combined and arranged that the mold and die-block are raised together, after clamping the blank between them, against the stress of the springs $h$, the inward movement of the movable mold-section or jaw taking place when the blank is clamped between them, the molding edges forcing the sole edges into shape. When the toggle-arms are brought into line, the mold-frame will be locked or held up by them and may retain this position for any suitable length of time to enable the compressed surfaces to become set.

The mold is made deeper than the thickness of the blank to be formed. The movement of the edges of the blank against the edge-surfaces of the mold, during the compression, also tends to solidify and smooth the edges of the blank. At C, in the drawing, I show a section of the die-block and an inner face view of one section of the mold.

I claim—

1. A die-block and an edge-forming mold, operating simultaneously to compress and compact together between them the layers of the blank, and to form the edges thereof to shape, by combined vertical and lateral pressure, substantially as described.

2. An adjustable edge-forming mold combined with a die-block to compress and compact together the layers of the sole-blank, and to form the edges thereof to shape, by combined vertical and lateral pressure, substantially as described.

3. An edge and sole forming mold composed of parts adapted to move to and from each other laterally, for the purpose of compressing the sole-blank laterally and holding it in place while subjected to vertical pressure, substantially as described.

4. A yielding die-block in combination with an adjustable edge-forming mold, substantially as described.

5. The piercers or awls combined with a yielding die-block and an adjustable edge-forming mold, substantially as described.

6. The adjustable incline in combination with the adjustable edge-forming mold, substantially as described.

S. W. BALDWIN.

Witnesses:
A. M. ELLIOTT,
M. D. GETTY.